US011576225B2

(12) United States Patent
Purkayastha et al.

(10) Patent No.: US 11,576,225 B2
(45) Date of Patent: Feb. 7, 2023

(54) SIDELINK UNICAST CONNECTION STATES

(71) Applicant: QUALCOMM Incorporated, San Diego, CA (US)

(72) Inventors: Punyaslok Purkayastha, San Diego, CA (US); Gavin Bernard Horn, La Jolla, CA (US); Karthika Paladugu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 140 days.

(21) Appl. No.: 17/118,534

(22) Filed: Dec. 10, 2020

(65) Prior Publication Data

US 2021/0185757 A1 Jun. 17, 2021

Related U.S. Application Data

(60) Provisional application No. 62/948,726, filed on Dec. 16, 2019.

(51) Int. Cl.
*H04W 76/23* (2018.01)
*H04W 76/14* (2018.01)
(Continued)

(52) U.S. Cl.
CPC .......... *H04W 76/23* (2018.02); *H04W 8/005* (2013.01); *H04W 72/0406* (2013.01); *H04W 76/14* (2018.02); *H04W 76/28* (2018.02)

(58) Field of Classification Search
CPC . H04W 76/28; H04W 52/0216; H04W 76/14; H04W 92/18; H04W 4/46;
(Continued)

(56) References Cited

U.S. PATENT DOCUMENTS

2015/0043455 A1* 2/2015 Miklos .................. H04W 76/11
370/329
2016/0302250 A1* 10/2016 Sheng .................. H04W 76/14
(Continued)

FOREIGN PATENT DOCUMENTS

WO    2015157995 A1    10/2015
WO    WO-2020223591 A1 *  11/2020

OTHER PUBLICATIONS

Ericsson (Rapporteur): "Summary of Email Discussion [107#75] [NR/V2X] RLF", 3GPP Draft, 3GPP TSG-RAN NG2 #107bis, R2-1913328—Summary of Email Discussion 107#75][NR-V2X] RLF, 3RD Generation Partnership Project 3GPP), Mobile Competence Centre, 650, Route Des Lucioles, F-06921 Sophia-Antipolis Cedex, vol. RAN NG2, No. Chongqing, China, Oct. 14, 2019-Oct. 18, 2019 Oct. 3, 2019 (Oct. 3, 2019), XP051804205, pp. 1-26.
(Continued)

*Primary Examiner* — Awet Haile
(74) *Attorney, Agent, or Firm* — Arent Fox, LLP

(57) ABSTRACT

A configuration to enable a UE to monitor the state of the connection with a peer UE in a sidelink communication. The apparatus establishes one or more unicast links with a second UE. The apparatus changes a connection state with the second UE from a sidelink disconnected state to a sidelink connected state based on an establishment of a first of the one or more unicast links. The apparatus changes the connection state with the second UE from the sidelink connected state to the sidelink disconnected state when each of the one or more unicast links with the second UE is released or when a configured timer expires.

31 Claims, 9 Drawing Sheets

(51) Int. Cl.
*H04W 76/28* (2018.01)
*H04W 72/04* (2009.01)
*H04W 8/00* (2009.01)

(58) Field of Classification Search
CPC ............. H04W 52/02; H04W 52/0235; H04W 52/028; H04W 72/12; H04W 88/02; H04W 72/0406; H04W 76/23; H04W 76/27; H04W 8/005
See application file for complete search history.

(56) References Cited

U.S. PATENT DOCUMENTS

| | | | |
|---|---|---|---|
| 2018/0160456 A1* | 6/2018 | Maheshwari | H04W 72/0446 |
| 2019/0254110 A1 | 8/2019 | He et al. | |
| 2020/0252989 A1* | 8/2020 | Chen | H04L 5/0048 |
| 2021/0168814 A1* | 6/2021 | Chen | H04W 72/0493 |
| 2021/0251023 A1* | 8/2021 | Phan | H04W 4/40 |
| 2021/0251039 A1* | 8/2021 | Liang | H04W 76/23 |
| 2022/0078818 A1* | 3/2022 | Sun | H04W 72/1284 |
| 2022/0167268 A1* | 5/2022 | Xu | H04W 52/0216 |

OTHER PUBLICATIONS

Item 1 Continued: Retrieved from the Internet: URL:https://ftp.3gpp.org/tsg_ran/WG2_RL2/TSGR2_107bis/Docs/R2-1913328.zip R2-1913328—Summary of email discussion [107#75][NRV2X] RLF.docx [retrieved on Oct. 3, 2019].
International Search Report and Written Opinion—PCT/US2020/064636—ISA/EPO—Apr. 12, 2021.

* cited by examiner

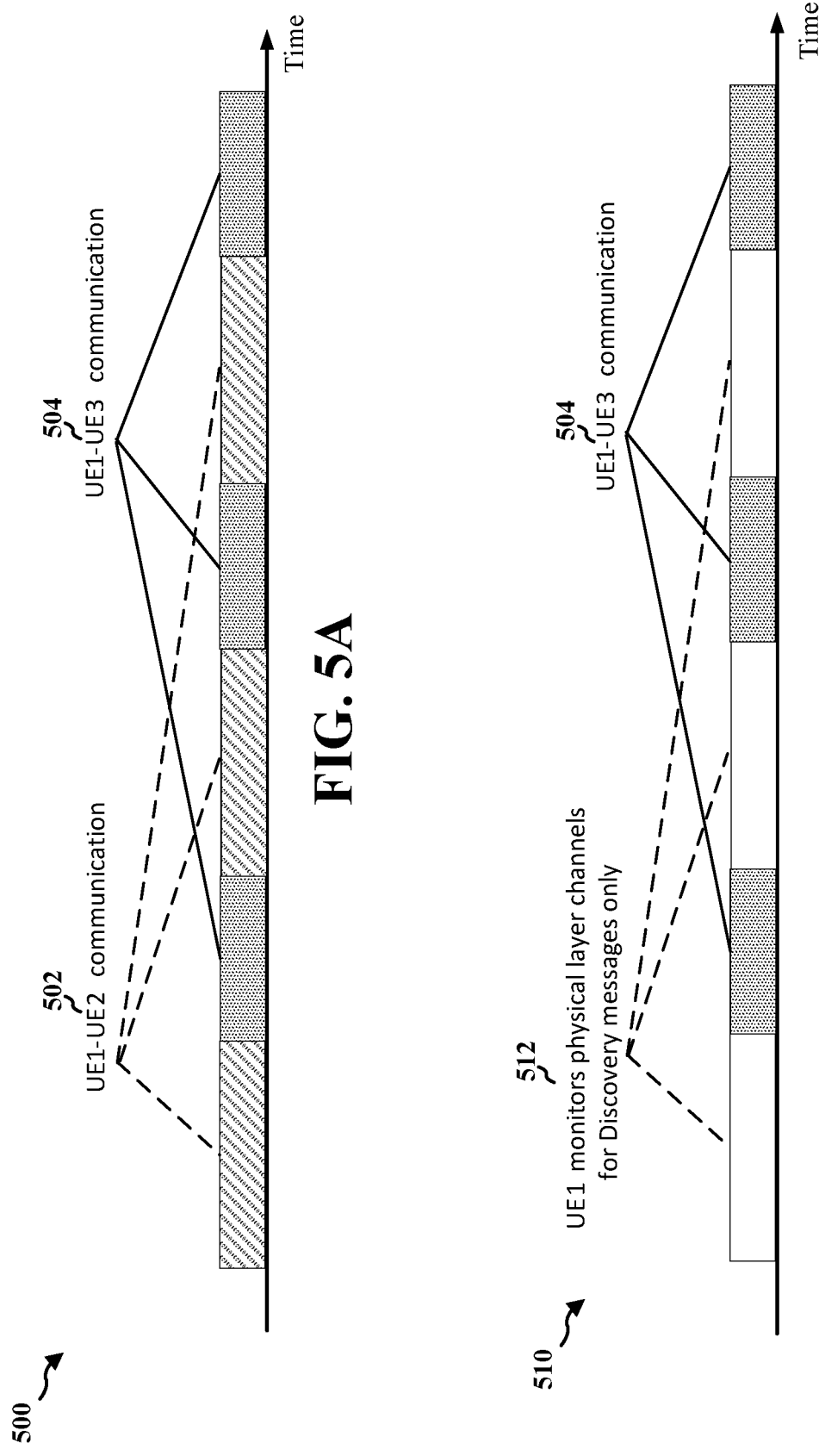

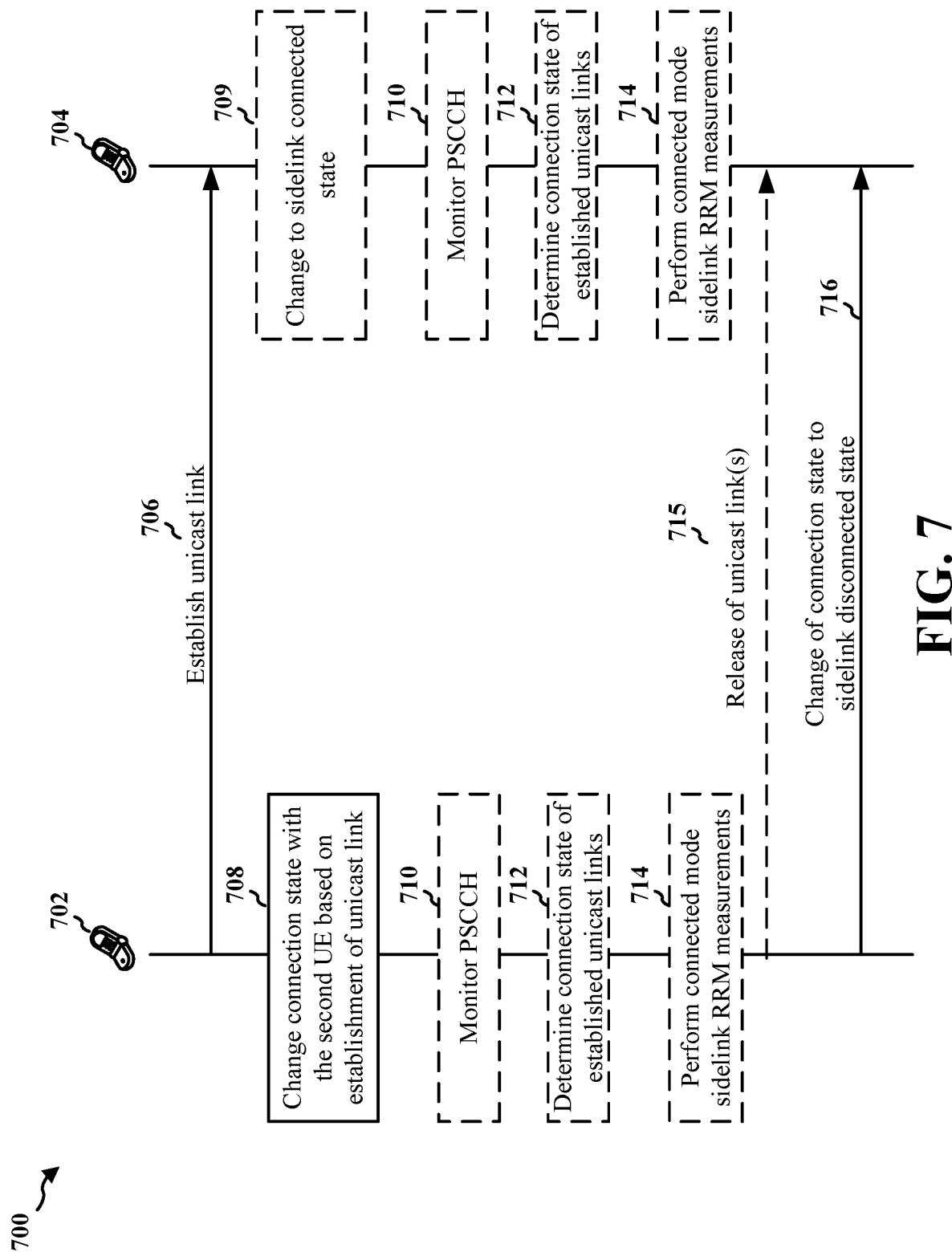

SIDELINK UNICAST CONNECTION STATES

CROSS-REFERENCE TO RELATED APPLICATION(S)

This application claims the benefit of U.S. Provisional Application Ser. No. 62/948,726, entitled "SIDELINK UNICAST CONNECTION STATES" and filed on Dec. 16, 2019, the contents of which are expressly incorporated by reference herein in their entirety.

BACKGROUND

Technical Field

The present disclosure relates generally to communication systems, and more particularly, to sidelink unicast connection states between user equipments (UEs).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus establishes one or more unicast links with a second UE. The apparatus changes a connection state with the second UE from a sidelink disconnected state to a sidelink connected state based on an establishment of a first of the one or more unicast links. The apparatus changes the connection state with the second UE from the sidelink connected state to the sidelink disconnected state when each unicast link of the one or more unicast links with the second UE is released or when a configured timer expires.

To the accomplishment of the foregoing and related ends, the one or more aspects comprise the features hereinafter fully described and particularly pointed out in the claims. The following description and the annexed drawings set forth illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A is a diagram illustrating time diagrams of UEs communicating via sidelink communication.

FIG. 5B is a diagram illustrating time diagrams of UEs communicating via sidelink communication.

FIG. 7 is a call flow diagram of signaling between a first UE and a second UE in accordance with aspects of the disclosure.

DETAILED DESCRIPTION

Figure 1:
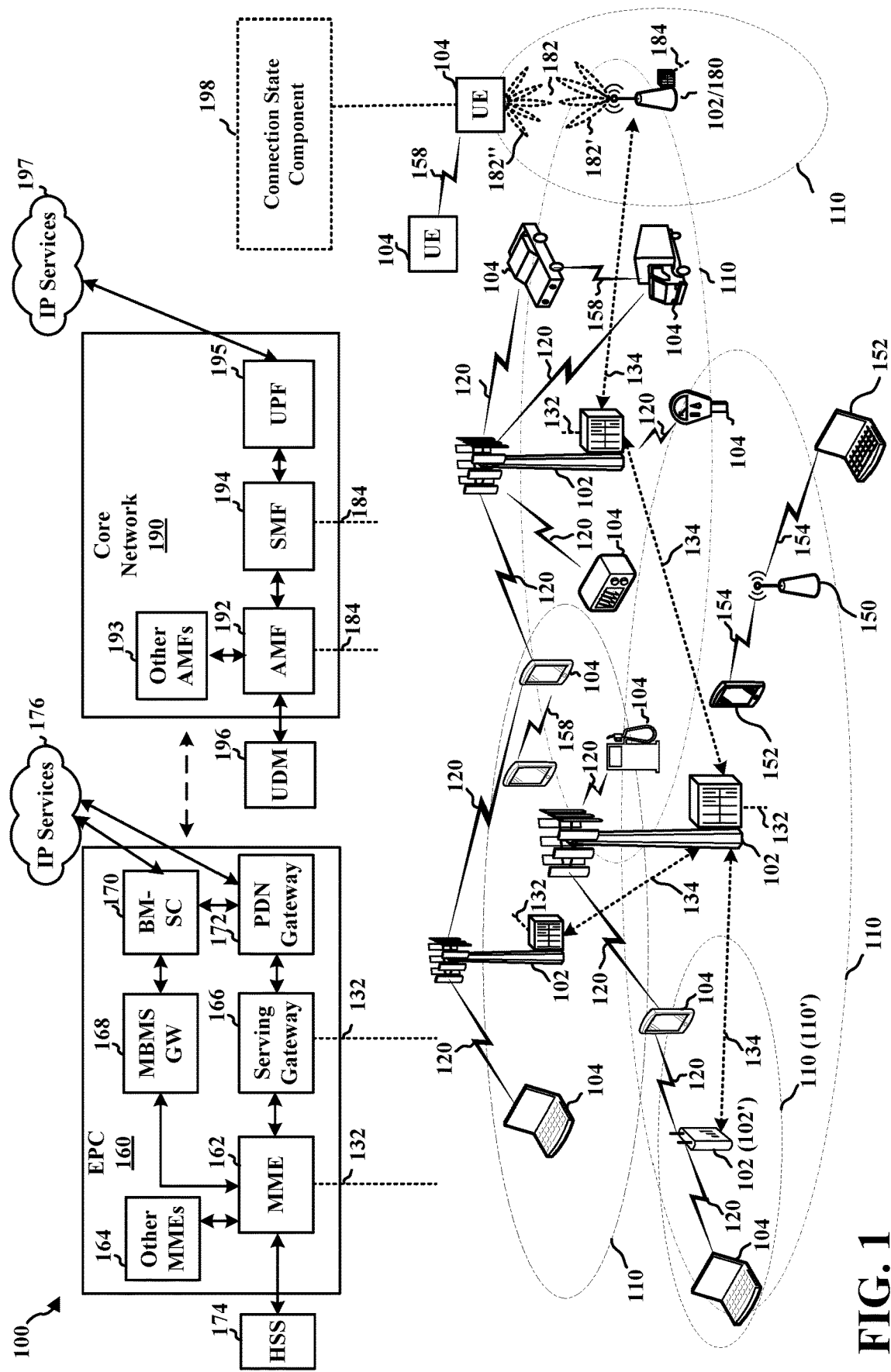
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

Some sidelink communication may include vehicle-based communication devices that may include vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), cellular-vehicle-to-everything (C-V2X) and/or a combination thereof and/or with other devices, which can be collectively referred to as vehicle-to-anything (V2X) communications. Referring again to FIG. 1, in some aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or other D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in some aspects, the UE 104 may establish a unicast link with another UE 104. The UE 104 may include a connection state component 198 that is configured to change a connection state of the UE 104 with the other UE from a sidelink disconnected state to a sidelink connected state based on an establishment of the unicast link. The connection state component 198 may be configured to change the connection state of the UE 104 with the other UE from the sidelink connected state to the sidelink disconnected state when each unicast link with the other UE is released or when a configured timer expires. The concepts described herein may be applicable to sidelink communication based on 5G NR, LTE, LTE-A, CDMA, GSM, and other wireless technologies.

Figure 2:
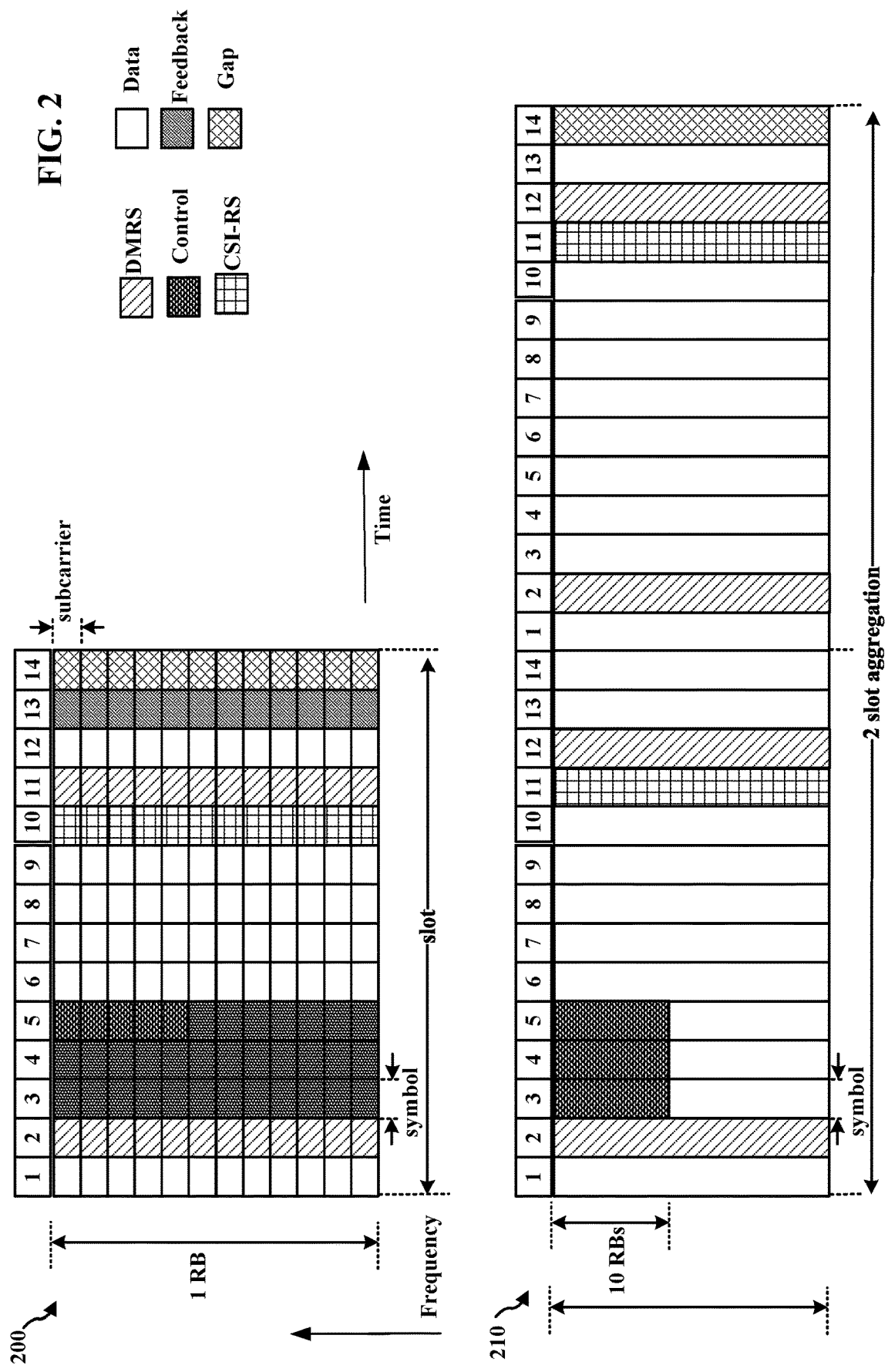
FIG. 2 illustrates example aspects of a sidelink slot structure.

FIG. 2 illustrates example diagrams 200 and 210 illustrating examples slot structures that may be used by a UE for wireless communication between UE 104 and UE 104', e.g., for sidelink communication. The slot structure may be for use within a 5G/NR frame structure. Although the following description may be focused on 5G NR, the concepts described herein may be applicable to other similar areas, such as LTE, LTE-A, CDMA, GSM, and other wireless technologies. The illustrated frame and slot structures represent merely one example, and other wireless communication technologies may have a different frame structure and/or different channels, for example. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For example, diagram 200 shows a slot structure using 14 symbols. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single resource block (RB), whereas diagram 210 illustrates some integer number of N RBs. In diagram 210, 10 RBs being used for control is merely one example. The number of RBs may differ.

A resource grid may be used to represent the frame structure. Each time slot may include an RB (also referred to as a physical RB (PRB)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with a demodulation reference signal (DMRS). FIG. 2 also illustrates that symbol(s) may comprise a channel state information reference signal (CSI-RS). The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on control information triggering). For time/frequency tracking, CSI-RS may be either periodic or aperiodic. CSI-RS may be transmitted in bursts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
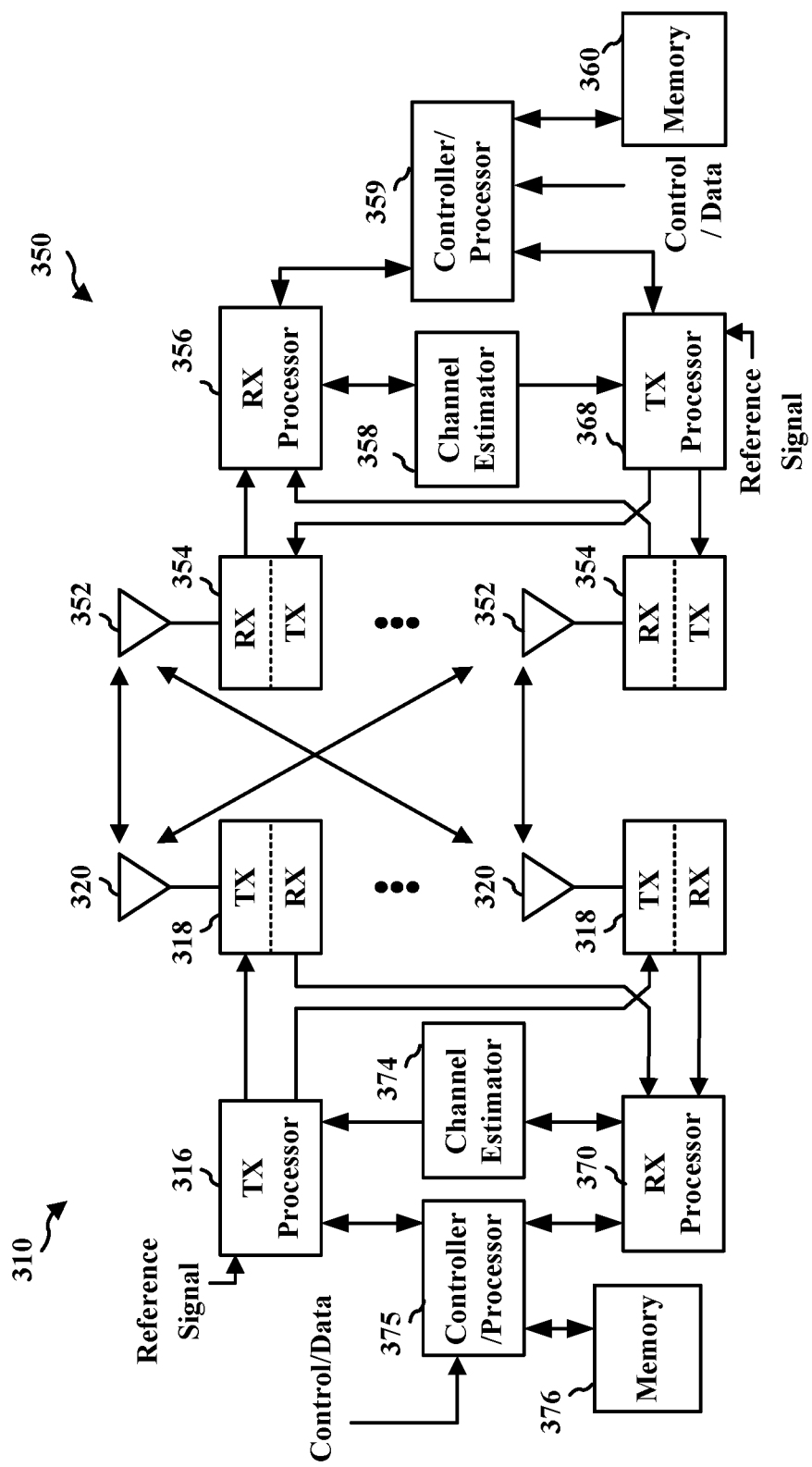
FIG. 3 is a diagram illustrating an example of a base station and user equipment (UE) in an access network.

FIG. 3 is a block diagram 300 of a first wireless communication device 310 in communication with a second wireless communication device 350, e.g., based on sidelink with a receiving device, e.g., device 350. As an example, sidelink based communication may include V2V, V2X, ProSe, or other D2D communication. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 of FIG. 1.

Figure 4:
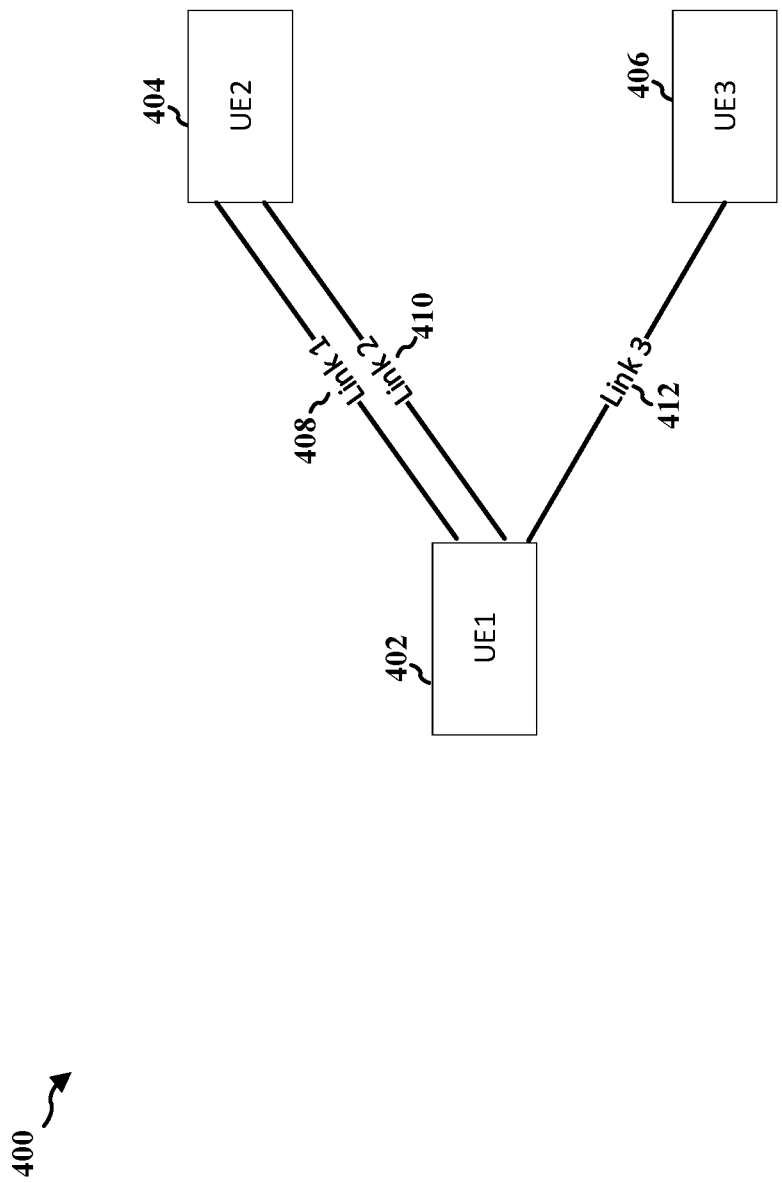
FIG. 4 is a diagram illustrating an example of UEs communicating via sidelink communication.

FIG. 4 is a diagram 400 illustrating an example of UEs communicating via sidelink communication. The diagram 400 includes a first UE 402, a second UE 404, and a third UE 406. One or more unicast links may be established between the first UE 402 and the second UE 404. In some aspects, the first UE 402 may exchange sidelink data with the second UE 404 over link 408 and may exchange sidelink data with the UE 404 over a second link 410. The different links between UE 402 and UE 404 may have different levels of security or different security keys, for example. FIG. 4 also illustrates a unicast link 412 between UE 402 and UE 406. UE 402 and UE 406 may exchange sidelink communication using unicast link 412.

The UEs 402, 404, and 406 may monitor for transmissions over PSCCH. In some examples, the UEs may monitor for PSCCH based on a connected mode discontinuous reception (C-DRX) configuration. The UEs 402, 404, and 406 may monitor for discovery messages from other UEs. The UEs 402, 404, and 406 may keep track of the state of each of their respective, established unicast links. The UEs 402, 404, and 406 may perform configured connected mode radio resource management (RRM) measurements. These actions may place a burden on battery power of the UE. As presented herein, the UEs may use a sidelink connected state and a sidelink disconnected state to reduce performance of some measurements or monitoring, at times, in order to achieve greater power savings.

A UE (e.g., first UE 402) may be in a sidelink connected state when one or more unicast links have been established between the UE (e.g., first UE 402) and a peer UE (e.g., second UE 404). For example, in FIG. 4, the first UE 402 and second UE 404 may transition to the sidelink connected state when the first unicast links (e.g., either 408 or 410) are established.

If a UE does not have a unicast link established with a peer UE, then the UE may be in a sidelink disconnected state. For example, the UE 402 and 404 may be in a sidelink disconnected state prior to the establishment of unicast links 408 and 410 and/or may transition to the sidelink disconnected state when both of the unicast links 408 and 410 have been released. In addition, while the first UE 402 may be in a sidelink connected state with the second UE 404 and in a sidelink connected state with the third UE 406, in some aspects, the first UE 402 may be in a sidelink connected state with the second UE 404 and in a sidelink disconnected state with the third UE 406. In yet additional aspects, the first UE 402 may be in a sidelink disconnected state with both the second and third UEs 404, 406. The use of the sidelink connected state and the sidelink disconnected state allows for ease of maintaining and monitoring the state of the connection between UEs.

Additionally, the use of different states may enable the UE to improve power savings. For example, in the absence of the sidelink disconnected state, UEs would continuously monitor PSCCH according to a configured sidelink C-DRX cycle, which may consume more power and reduce the UE battery lifetime. Conversely, in the sidelink disconnected state, the UE may monitor physical layer channels for discovery messages transmitted by other peer UEs according to a configured periodicity. These discovery messages may be intended to be sparsely transmitted and/or may be transmitted with a low periodicity. The inclusion of the sidelink disconnected state allows for UEs to realize power savings, because UEs may not need to continuously monitor PSCCH according to the configured sidelink C-DRX.

UEs that have an established unicast link may be considered as being in a sidelink connected state. The sidelink connected state may include an access stratum (AS) layer connection state between the UE and its peer UE. UEs in sidelink connected states may be configured to monitor PSCCH according to a configured C-DRX cycle from peer UEs. UEs in the sidelink connected state may be configured to keep track of the state of each of the unicast links the UE has established with a peer UE. Additionally, the UE in the sidelink connected state may be configured to perform RRM measurements which may be configured for sidelink connected mode.

In some aspects, for example, when the first and second UEs are out-of-coverage or in an RRC idle state, an RRC inactive state, or an RRC connected state, the C-DRX configuration may be negotiated between the first and second UEs. In some aspects, a wake-up cycle of the UE may be determined by the C-DRX configuration associated with each unicast link between the UE and a peer UE. In instances where the first and second UEs are in RRC connected states state or in partial coverage of a base station, the C-DRX configuration may be determined by the base station to which the respective UEs are connected. The UE may be configured to wake-up additionally outside of the C-DRX cycle, e.g., if the configured C-DRX cycle is not sufficient to enable the UE to receive periodic discovery messages transmitted by other peer UEs. In some aspects, the configured C-DRX may be based on application Quality of Service (QoS) profiles and service types, and power profiles of the UEs.

Referring back to FIG. 4, data transfer may occur on the unicast connections (e.g., 408, 410) between the first UE 402 and the second UE 404, while data transfer may occur on the unicast connection (e.g., 412) between the first UE 402 and the third UE 406. The data transfers may be based on a time division multiplexing pattern (e.g., 502, 504), as shown in FIG. 5A. In aspects where data transfer (e.g., 502) between the first UE 402 and the second UE 404 is completed, the first UE 402, at 512, may, to save power, limit monitoring for discovery messages to the time periods previously allotted for data transfer between the first UE and the second UE, as shown in FIG. 5B. Otherwise, e.g., in a sidelink connected state, the first UE would continuously monitor PSCCH according to a C-DRX cycle during the time previously allotted for data transfer between the first UE and the second UE.

Upon completion of the data transfer between the first UE 402 and the second UE 404, and depending on the traffic on the unicast connection between the first and second UE, a scheduler may be configured to allocate at least a portion of the time previously allotted for communication between the first and second UE to a data transfer between the first and third UE. The second UE 404 may also realize a similar power savings by limiting monitoring to monitoring for discovery messages from other peer UEs during the time previously allotted for communication with the first UE, when data transfer with the first UE has completed.

Figure 6A:
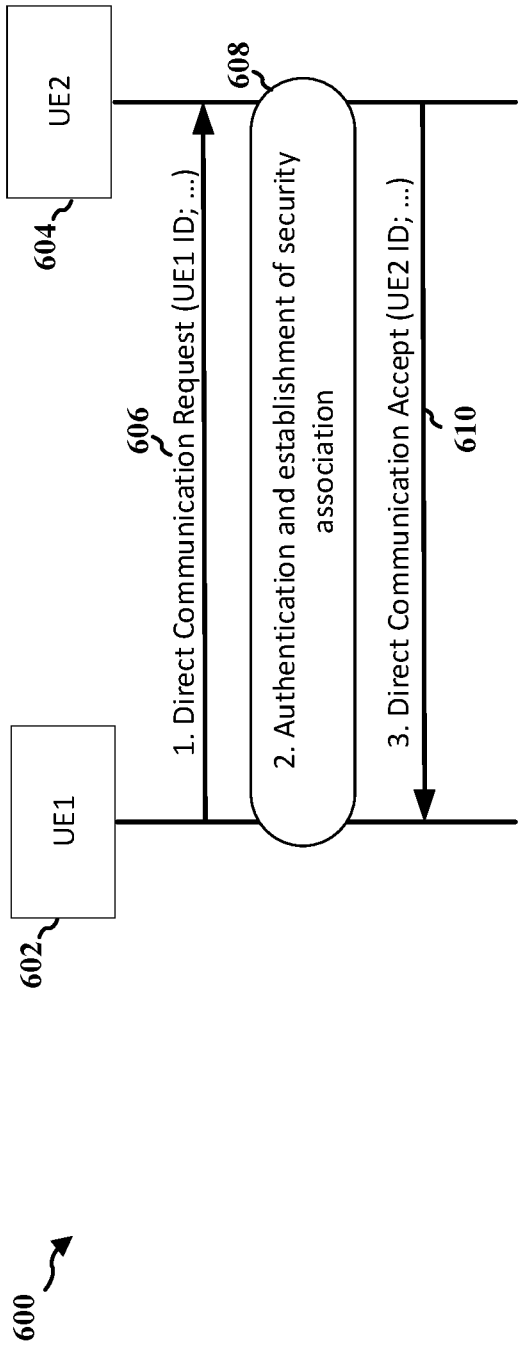
FIG. 6A is a diagram of UEs establishing a sidelink communication link in accordance with aspects of the disclosure.

In order to establish and maintain the connection state, two peer UEs (e.g., first UE 402, second UE 404) may keep track of established unicast links and the connection between the two UEs. For example, to establish and maintain a connection state between the two UEs, initial messages may be exchanged between the two UEs in order to establish a unicast link. The exchange of messages may include unique UE identification. FIG. 6A is an example of initial messages that may be exchanged between a first UE 602 and a second UE 604 to establish a unicast link. In some aspects, the initial message sent by the first UE 602 to the second UE 604 may include a direct communication request 606. The direct communication request 606 may include a unique identification for the first UE 602. At 608, the first UE 602 and the second UE 604 may exchange information concerning the authentication and establishment of security association. Then, the second UE 604 may respond to the first UE 602 with its own initial message which may include a direct communication accept 608. The direct communication accept 608 may include a unique identification for the second UE 604. The first and second UEs may be aware that a unicast connection has been established between each other when the unique UE identifications have been exchanged. As discussed above, the respective UE identifications of the first and second UEs may be exchanged in their respective initial messages for establishing the unicast connection.

Figure 6B:
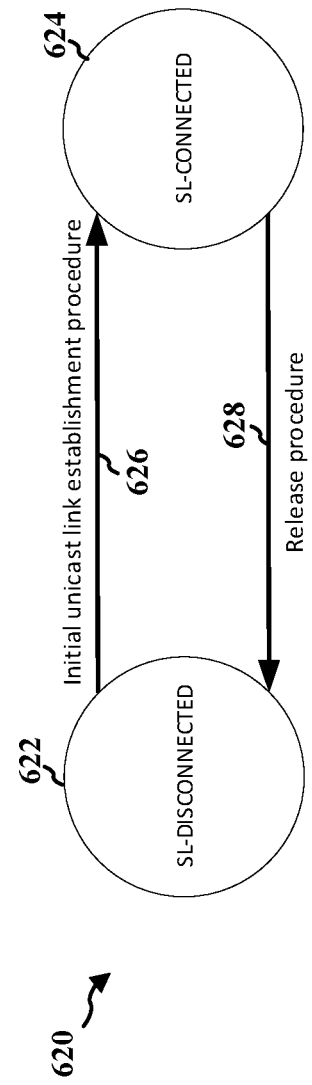
FIG. 6B is a diagram of UEs transitioning between connection states in accordance with aspects of the disclosure.

FIG. 6B is a diagram 620 of UEs transitioning between connection states. With reference to FIG. 6B, two peer UEs (e.g., 602, 604) may transition to the sidelink connected state 624, from the sidelink disconnected state 622, upon the successful establishment of at least one initial unicast link (e.g., 626) for sidelink communication. More than one unicast link may be established between the UEs for sidelink communication. The peer UEs (e.g., 602, 604) may be configured to keep track of each of the unicast links that are established between the two UEs while in the sidelink connected state 624. The initial unicast link establishment procedure 626 may be similar to the procedure discussed above in FIG. 6A.

In some aspects, the UEs may transition to the sidelink disconnected state 622 if data transmission has finished on all of the unicast links of the connection, e.g., when each unicast link established between the two UEs is released. In some aspects, a release procedure 628 may be initiated, whereby a release message may be transmitted to the second UE 604 from the first UE 602. The release message may indicate the transition to the sidelink disconnected state 622. In some aspects, a UE (e.g., first UE 602) may use a timer before sending the release message. If there is no data transmission on the last active unicast link prior to the expiration of the timer, the UE may proceed to send the release message. In some aspects, the UE may send the release message in a disconnect request message or a disconnect response message associated with the last active unicast link. In some aspects, UEs that transition to the sidelink disconnected state or the sidelink connected state may send an indication to their respective base stations, indicating the transition of states. The indication may be sent by one or both peer UEs. For example, a first UE may transition to a sidelink disconnected state and may send an indication to a base station to which it is RRC connected. In another example, a first UE may transition to a sidelink disconnected state, and the second UE sends an indication to a base station to which the second UE is RRC connected. In another example, both the first UE and the second UE may send an indication of the transition to the sidelink disconnected state to a respective base station to which the UEs are RRC connected.

FIG. 7 illustrates an example communication flow 700 between a first UE 702 and a second UE 704. The first UE 702 and second UE 704 may be connected to a same base station (not shown), or may be connected to different base stations (not shown). In the context of FIG. 1, the UEs 702, 704 may correspond to at least UE 104. In another example, in the context of FIG. 3, the UEs 702, 704 may correspond to the wireless device 350.

The first UE 702 may be configured to establish a unicast link with the second UE 704. Upon the establishment of the unicast link between the first UE 702 and the second UE 704, a connection state between the first UE and the second UE may be referred to as a sidelink connected state. The sidelink connected state occurs when one or more unicast links are established between two UEs (e.g., 702, 704).

The first UE 702, at 708, may change the connection state with the second UE 704 from a sidelink disconnected state to the sidelink connected state based on the establishment of the unicast link. Thus, the UE 704 may operate based on a sidelink connected state with the UE 702, as illustrated at 709. In some aspects, the first UE 702 may monitor physical layer channels for discovery messages transmitted by other peer UEs (e.g., third UE 406 of FIG. 4) according to a configured periodicity while in the sidelink disconnected state. The first UE 702 may transition from the sidelink disconnected state to the sidelink connected state upon establishing the first unicast link with the second UE 704. In some aspects, as shown for example in FIG. 6A, the first UE and the second UE may exchange respective unique UE identifications (e.g., 606, 610) in initial messages of the unicast link establishment procedure to establish a unicast link between the first UE and the second UE. In some aspects, the initial messages of the unicast link establishment procedure may comprise a direct communication request (e.g., 606) or a direct communication accept (e.g., 610). The direct communication request may be sent from the first UE 702 to the second UE 704, while the direct communication accept may be send from the second UE 704 to the first UE 702. In some aspects, the unique UE identification of the second UE may be received in at least one of the response messages from the second UE to the first UE in an authentication and security association establishment procedure (e.g., 608) performed as part of the unicast link establishment procedure. In some aspects, the first UE may transmit an indication to a base station to which the first UE is connected if the first UE transitions to sidelink disconnected state or sidelink connected state and is RRC connected. In yet some aspects, both the second UE and the first UE may transmit an indication to respective base stations they are connected to if both the second UE and the first UE transition to a sidelink disconnected state or a sidelink connected state and both the second UE and the first UE are RRC connected.

In some aspects, for example at 710, the first UE 702 and the second UE 704, while in the sidelink connected state, may be configured to monitor a physical sidelink control channel (PSCCH) based on a configured sidelink connected mode discontinuous reception (C-DRX). In some aspects, the first UE 702 may monitor the PSCCH for data transmitted on unicast links established with other peer UEs (e.g., third UE 406) and according to the configured C-DRX while in the sidelink connected state.

In some aspects, for example at 712, the first UE 702 and the second UE 704, while in the sidelink connected state, may be further configured to determine the connection state of each of one or more established unicast links with the second UE 704. In some aspects, the first UE 702 may transition to the sidelink disconnected state when data transmission is completed on the one or more established unicast links with the second UE 704. In such aspects, upon completion of data transmission on all the unicast links, the first UE may send a release message to the second UE. The release message to the second UE may indicate the transition to the sidelink disconnected state. The release message may comprise a disconnect request or a disconnect response.

In some aspects, for example at 714, the first UE 702 and the second UE 704, while in the sidelink connected state, may be further configured to perform connected mode sidelink RRM measurements associated with each unicast link with the second UE. In some aspects, the RRM measurements may comprise reference signal received power (RSRP), reference signal received quality (RSRQ), signal-to-noise and interference ratio (SINR), or received signal strength indicator (RSSI).

The first UE 702, at 716, may be configured to change the connection state with the second UE 704. The first UE 702 may change the connection state with the second UE 704 from the sidelink connected state to the sidelink disconnected state. The first UE may change the connection state with the second UE from sidelink connected state (e.g., 624) to sidelink disconnected state (e.g., 622) when each unicast link with the second UE is released, for example, as shown in FIG. 6B. The first UE may change the connection state with the second UE from sidelink connected state (e.g., 624) to sidelink disconnected state (e.g., 622) when a configured timer expires. In some aspects, the first UE transitions to the sidelink disconnected state if after the completion of data transmission on the one or more established unicast links with the second UE, the configured timer is started at the first UE, and if there is no further data transmission with the second UE before the configured timer expires. In such instances, the first UE 702 may send a release message 716 (e.g., similar to 628) to the second UE 704 to indicate that the first UE 702 is transitioning to the sidelink disconnected state. In some examples, the message 716 may be sent after each unicast link between the UEs 702 and 704 is released, e.g., at 715. The second UE 704 may transition to the sidelink disconnected state upon receipt of the release message from the first UE 702. When in the sidelink disconnected state, the UE(s) may skip or reduce some actions of the UE. For example, the UE(s) may limit monitoring to monitoring for discovery messages from other UEs. The UE(s) may skip PSCCH monitoring based on a C-DRX cycle and may reduce or skip RRM measurements. As the unicast link(s) between the UEs have been released, the UE(s) may not keep track of the state of such unicast links. The table below illustrates some differences between example aspects of a sidelink disconnected state for a PC5 link and an RRC idle state for a Uu link. It should be noted that the information in the following table is solely for illustrative purposes and that additional and different distinctions may be present depending on the factors like the configurations of the UEs, the base station(s) and the links.

| Uu Link | PC5 Link |
| --- | --- |
| In RRC_IDLE, a UE monitors paging channels for paging messages transmitted by a network | In sidelink disconnected state, the UE monitors for physical layer channels for discovery messages transmitted by other UEs. From the discovery messages, the UE may identify other UEs with which it can connect. |
| If a UE in RRC_IDLE moves out of a configured tracking | In one configuration, the UE in a sidelink disconnected state does not |

| Uu Link | PC5 Link |
|---|---|
| area, the UE establishes an RRC connection and registers with the network in order to be provided with new tracking area information. | perform this action based on moving to a new tracking area |
| For a UE in RRC_IDLE, if uplink data is received from the upper layers or a page is received, the NAS Service Request procedure is triggered. The UE then selects a cell and connects to the network using that cell in order to transmit the uplink data | For a UE in the sidelink disconnected state, if data is received from the upper layers, there is a procedure to determine whether a Uu or PC5 link will be used for the data transfer. In one implementation, if it is determined that the PC5 link will be used, the UE may establish a unicast link with the destination UE and then may initiate data transfer. |

Figure 8:
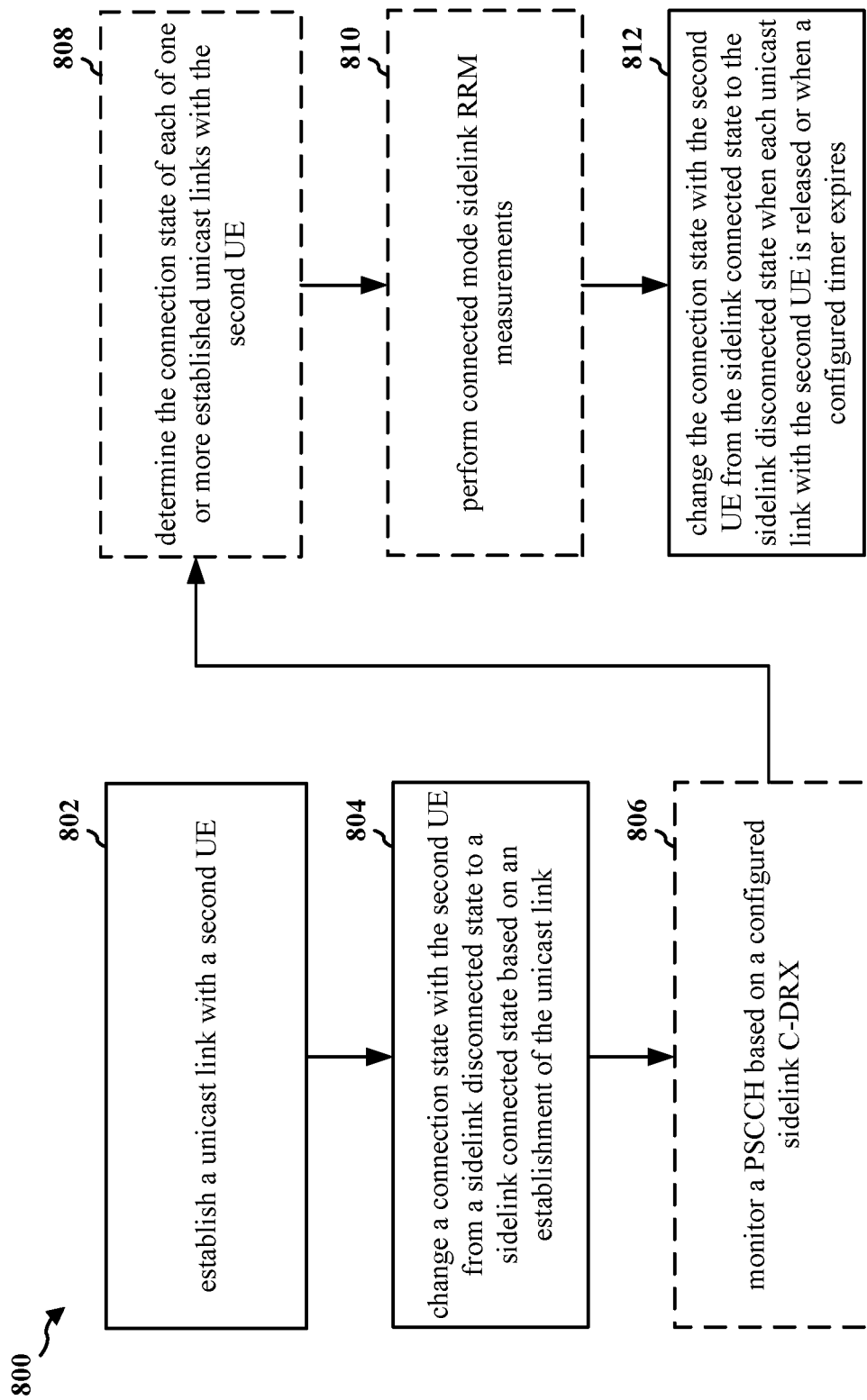
FIG. 8 is a flowchart of a method of wireless communication.

FIG. 8 is a flowchart 800 of a method of wireless communication. The method may be performed by a UE or a component of a UE (e.g., the UE 104, 402, 404, 406, 602, 604, 702, 704; device 350; a processing system, which may include memory and components configured to perform each of the blocks of the method, and which may be an entire UE or a component of a UE, such as the TX processor 368, the RX processor 356, and/or the controller/processor 359). According to various aspects, one or more of the illustrated operations of method may be omitted, transposed, and/or contemporaneously performed. Optional aspects are illustrated with a dashed line. The method may enable a UE to monitor the state of the connection with a peer UE in a sidelink communication.

At 802, a first UE may establish a unicast link with a second UE. For example, a first UE (e.g., 402, 602, 702) may establish a unicast link with a second UE (e.g., 404, 604, 704). In some instances, when the unicast link between the first UE and second UE has been established, the connection state between the first UE and second UE may be referred to as a sidelink connected state. The sidelink connected state may occur when one or more unicast links are established between two UEs. In some aspects, the first UE may monitor physical layer channels for discovery messages transmitted by other peer UEs according to a configured periodicity while in the sidelink disconnected state. The first UE may transition from the sidelink disconnected state to the sidelink connected state upon establishing the first unicast link with the second UE. In some aspects, as shown for example in FIG. 6A, the first UE and the second UE may exchange respective unique UE identifications. The first and second UEs may exchange their respective unique UE identifications (e.g., 606, 610) in initial messages of the unicast link establishment procedure to establish a unicast link between the first UE and the second UE. The initial messages of the unicast link establishment procedure may comprise a direct communication request (e.g., 606) or a direct communication accept (e.g., 610). In some aspects, the unique UE identification of the second UE may be received in at least one of the response messages from the second UE to the first UE in an authentication and security association establishment procedure (e.g., 608) performed as part of the unicast link establishment procedure. In some aspects, the first UE may transmit an indication to a base station serving the first UE if the first UE transitions to a sidelink disconnected state or sidelink connected state and is RRC connected. In yet some aspects, both the second UE and the first UE may transmit an indication to their respective base stations if both the second UE and the first UE transition to a sidelink disconnected state or a sidelink connected state and both the second UE and the first UE are RRC connected.

At 804, the first UE may change a connection state with the second UE from a sidelink disconnected state to a sidelink connected state. The first UE may change the connection state with the second UE from the sidelink disconnected state to the sidelink connected state based on an establishment of the unicast link.

In some aspects, for example at 806, the first UE while in the sidelink connected state may monitor a PSCCH. The first UE may monitor the PSCCH, while in the sidelink connected state, based on a configured sidelink C-DRX. In some aspects, the first UE may monitor the PSCCH for data transmitted on unicast links established with other peer UEs and according to the configured C-DRX while in the sidelink connected state.

The C-DRX configuration may be negotiated between the first UE and the second UE, e.g., if the UEs are in an RRC idle state, an RRC inactive state, or an RRC connected state. The first UE may determine a wake-up cycle based on a C-DRX configuration associated with each link established with the second UE. The C-DRX configuration may be received from a base station, e.g., if the UEs are in an RRC connected state or in partial coverage of a base station. The base station may be a base station to which one of the UEs is connected. In the sidelink connected state, the first UE may further perform an additional wake-up outside of a configured C-DRX cycle to monitor for periodic discovery messages from other UEs, e.g., if the C-DRX cycle is not sufficient to cover periodic discovery messages from peer UEs. The C-DRX configuration may be based on at least one of an application QoS profile, a service type, or a power profile of the first UE and the second UE. For example, if the C-DRX cycle wake-up times are configured in a way that the UE may miss discovery messages by another UE, then the C-DRX cycle is not sufficient for the UE to monitor for discovery messages.

In some aspects, for example at 808, the first UE while in the sidelink connected state may determine the connection state of each of one or more established unicast links with the second UE. In some aspects, the first UE may transition to the sidelink disconnected state when data transmission is completed on the one or more established unicast links with the second UE. In such aspects, upon completion of data transmission on all the unicast links, the first UE may send a release message to the second UE. The release message to the second UE may indicate the transition to the sidelink disconnected state. The release message may comprise a disconnect request or a disconnect response.

In some aspects, for example at 810, the first UE while in the sidelink connected state may perform connected mode sidelink radio resource management (RRM) measurements associated with each unicast link with the second UE. In some aspects, the RRM measurements may comprise RSRP, RSRQ, SINR, or RSSI.

At 812, the first UE may change the connection state with the second UE from the sidelink connected state to the sidelink disconnected state. The first UE may change the connection state with the second UE from sidelink connected state (e.g., 624) to sidelink disconnected state (e.g., 622) when each unicast link with the second UE is released, for example, as shown in FIG. 6B. The first UE may change the connection state with the second UE from sidelink connected state (e.g., 624) to sidelink disconnected state (e.g., 622) when a configured timer expires. In some aspects, the first UE transitions to the sidelink disconnected state if, after the completion of data transmission on the one or more established unicast links with the second UE, the configured timer is started at the first UE, and if there is no further data transmission with the second UE before the configured timer expires. In such instances, the first UE may send a release message (e.g., 628) to the second UE to indicate that the first UE is transitioning to the sidelink disconnected state. The second UE may transition to the sidelink disconnected state upon receipt of the release message from the first UE.

An apparatus may be provided that includes components that perform each of the blocks of the algorithm in the aforementioned flowchart of FIG. 8, and aspects of the communication flow in FIG. 7. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. The components include the UE 104 and the connection state component 198 in FIG. 1; the UE 350 of FIG. 3, and the UE 402 of FIG. 4; and other descriptions of the components herein. These components perform the means for establishing one or more unicast links with a second UE; means for changing a connection state with the second UE from a sidelink disconnected state to a sidelink connected state based on an establishment of the first of the one or more unicast link; means for changing the connection state with the second UE from the sidelink connected state to the sidelink disconnected state when each unicast link of the one or more unicast links with the second UE is released or when a configured timer expires; means, while in the sidelink connected state, for monitoring a physical sidelink control channel (PSCCH) based on a configured sidelink connected mode discontinuous reception (C-DRX); means for determining a wake-up cycle based on a C-DRX configuration associated with each of the one or more unicast links established with the second UE; means for determining the state of each of the one or more established unicast links; means for performing connected mode sidelink radio resource management (RRM) measurements for each of the one or more unicast links; means for monitoring the PSCCH for data on unicast links established with other peer UEs and according to the C-DRX configuration while in the sidelink connected state; and means for transitioning to the sidelink disconnected state when, after the completion of data transmission on the one or more established unicast links with the second UE, the configured timer is started at the first UE and there is no further data transmission with the second UE before the configured timer expires.

Figure 9:
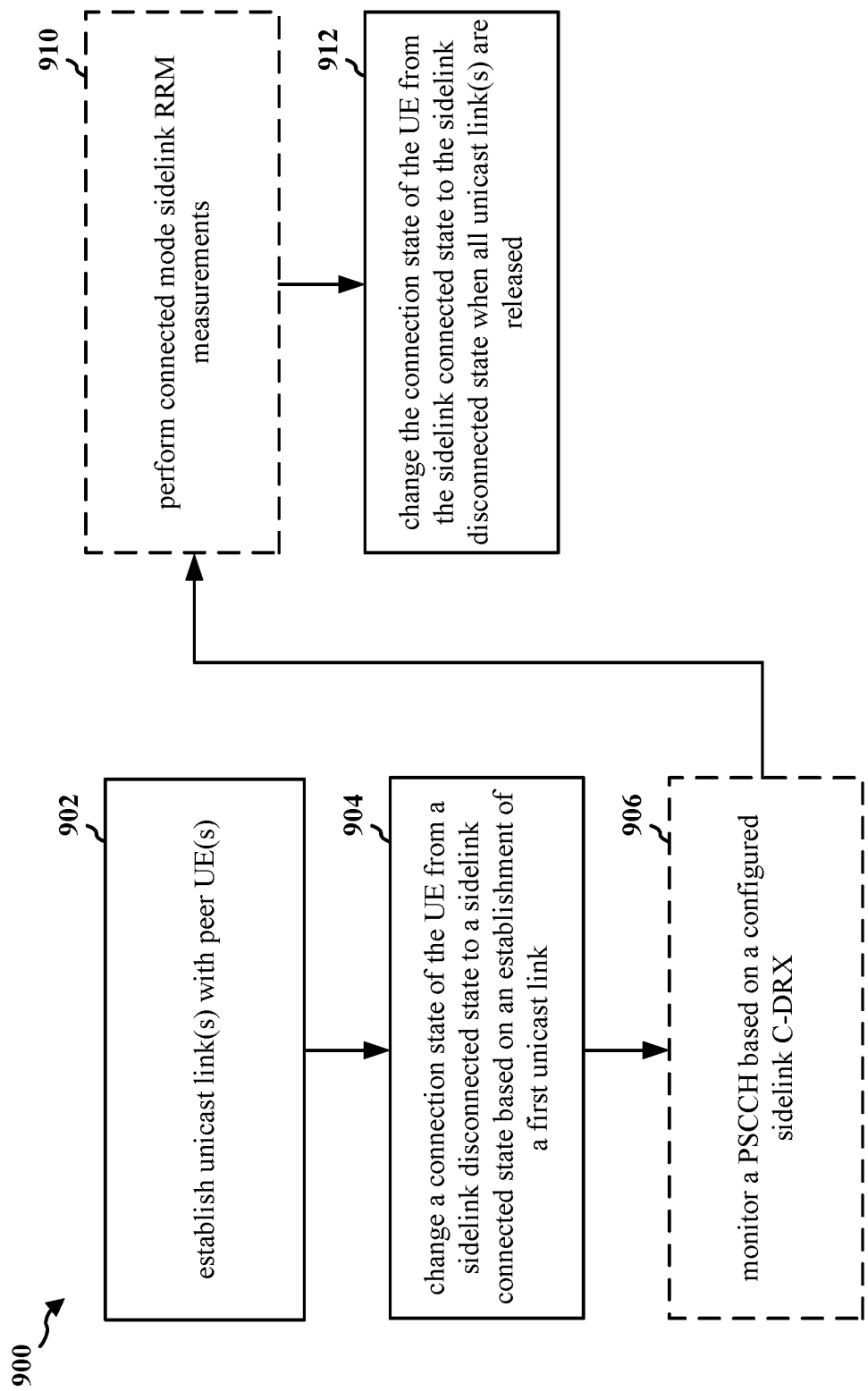
FIG. 9 is a flowchart of a method of wireless communication.

FIG. 9 is a flowchart 900 of a method of wireless communication. The method may be performed by a UE or a component of a UE (e.g., the UE 104, 402, 404, 406, 602, 604, 702, 704; device 350; a processing system, which may include memory and components configured to perform each of the blocks of the method, and which may be an entire UE or a component of a UE, such as the TX processor 368, the RX processor 356, and/or the controller/processor 359). According to various aspects, one or more of the illustrated operations of method may be omitted, transposed, and/or contemporaneously performed. Optional aspects are illustrated with a dashed line. The method may enable a UE to monitor the state of the connection with a peer UE in a sidelink communication.

At 902, the UE establishes one or more unicast links with at least one peer UE. For example, a first UE (e.g., 402, 602, 702) may establish a unicast link with a second UE (e.g., 404, 604, 704). The first UE may established multiple unicast links with the second UE and/or may establish other unicast links with other UEs.

At 904, the UE may change its connection state from a sidelink disconnected state to a sidelink connected state based on an establishment of a first unicast link with a peer UE. Thus, the UE may be in a sidelink connected state when it has a unicast link established with a peer UE and may be in a sidelink disconnected state when the UE does not have a unicast link established with a peer UE.

The first UE may transition from the sidelink disconnected state to the sidelink connected state upon establishing the first unicast link with a second UE. In some aspects, as shown for example in FIG. 6A, the first UE and the second UE may exchange respective unique UE identifications. The first and second UEs may exchange their respective unique UE identifications (e.g., 606, 610) in initial messages of the unicast link establishment procedure to establish a unicast link between the first UE and the second UE. The initial messages of the unicast link establishment procedure may comprise a direct communication request (e.g., 606) or a direct communication accept (e.g., 610). In some aspects, the unique UE identification of the second UE may be received in at least one of the response messages from the second UE to the first UE in an authentication and security association establishment procedure (e.g., 608) performed as part of the unicast link establishment procedure. In some aspects, the UE may transmit an indication to a base station that the UE is connected to if the UE transitions to sidelink disconnected state or sidelink connected state and is RRC connected.

In some aspects, for example at 906, the UE, while in the sidelink connected state, may monitor a PSCCH. The UE may monitor the PSCCH, while in the sidelink connected state, based on a configured sidelink C-DRX. In some aspects, the UE may monitor the PSCCH for data transmitted on unicast links established with other peer UEs and according to the configured C-DRX while in the sidelink connected state.

The C-DRX configuration may be received from a base station or may be negotiated between the UE and a peer UEs with which the UE has established a unicast link. The UE may determine a wake-up cycle based on each C-DRX configuration associated with the one or more established links. In the sidelink connected state, the UE may further perform an additional wake-up outside of a configured C-DRX cycle to monitor for periodic discovery messages transmitted by other UEs. The C-DRX configuration may be based on at least one of an application quality of service profile, a service type, or a power profile of the UE or the at least one peer UE.

The UE may determine the connection state of each of one or more established unicast links with the second UE. In some aspects, the first UE may transition to the sidelink disconnected state when data transmission is completed on the one or more established unicast links with the second UE. In such aspects, upon completion of data transmission on all the unicast links, the first UE may send a release message to the second UE. The release message to the second UE may indicate the transition to the sidelink disconnected state. The release message may comprise a disconnect request or a disconnect response.

In some aspects, for example at 910, the UE, while in the sidelink connected state, may perform connected mode sidelink radio resource management (RRM) measurements.

In some aspects, the RRM measurements may comprise RSRP, RSRQ, SINR, or RSSI measurements, or other types of measurements.

At 912, the UE may change the connection state of the UE from the sidelink connected state to the sidelink disconnected state when all of the one or more unicast links with the at least one peer UE are released. The UE may change the connection state from the sidelink connected state (e.g., 624) to the sidelink disconnected state (e.g., 622) when each unicast link with peer UE(s) is released, for example, as shown in FIG. 6B.

An apparatus may be provided that includes components that perform each of the blocks of the algorithm in the aforementioned flowchart of FIG. 9, and aspects of the communication flow in FIG. 7. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The following examples illustrate example embodiments. These embodiments and aspects of these embodiments may be used in combination with any previous embodiments or aspects of the previous embodiments disclosed or discussed in relation to the systems, methods, or devices of the figures.

Example 1 is a method of wireless communication at a first UE that includes establishing one or more unicast links with a second UE, changing a connection state with the second UE from a sidelink disconnected state to a sidelink connected state based on an establishment of a first of the one or more unicast links, and changing the connection state with the second UE from the sidelink connected state to the sidelink disconnected state when each unicast link of the one or more unicast links with the second UE is released or when a configured timer expires.

In Example 2, the method of example 1 further includes performing while in the sidelink connected state, at least one of: monitoring a PSCCH based on a configured sidelink C-DRX, determining the connection state of each of one or more established unicast links with the second UE, or performing connected mode sidelink RRM measurements associated with each unicast link with the second UE.

In Example 3, the method of Example 1 or Example 2 further includes that the C-DRX configuration is negotiated between the first UE and the second UE.

In Example 4, the method of any of Examples 1-3 further includes that the first UE determines a wake-up cycle based on a C-DRX configuration associated with each unicast link established with the second UE.

In Example 5, the method of any of Examples 1-3 further includes that the C-DRX configuration is received from a base station.

In Example 6, the method of any of Examples 1-5 further includes that in the sidelink connected state, the first UE further performs an additional wake-up outside of a configured C-DRX cycle to monitor for periodic discovery messages from other UEs.

In Example 7, the method of any of Examples 1-6 further includes that the C-DRX configuration is based on at least one of an application quality of service profile, a service type, or a power profile of the first UE and the second UE.

In Example 8, the method of any of Examples 1-7 further includes that the first UE monitors the PSCCH for data transmitted on unicast links established with other peer UEs and according to the configured C-DRX while in the sidelink connected state.

In Example 9, the any of Examples 1-8 further includes the first UE transitions to the sidelink disconnected state when data transmission is completed on the one or more established unicast links with the second UE.

In Example 10, the method any of Examples 1-9 further includes upon completion of data transmission on all the unicast links, the first UE sends a release message to the second UE to indicate the transition to the sidelink disconnected state, wherein the release message comprise a disconnect request or a disconnect response.

In Example 11, the method any of Examples 1-10 further includes the first UE transitions to the sidelink disconnected state if after the completion of data transmission on the one or more established unicast links with the second UE, the configured timer is started at the first UE, wherein if there is no further data transmission with the second UE before the configured timer expires, the first UE sends a release message to the second UE to indicate that the first UE is transitioning to the sidelink disconnected state, wherein the second UE transitions to the sidelink disconnected state upon receipt of the release message.

In Example 12, the method of any of examples 1-11 further includes monitoring physical layer channels for discovery messages transmitted by other peer UEs according to a configured periodicity while in the sidelink disconnected state.

In Example 13, the method of any of examples 1-12 further includes the first UE transitions from the sidelink disconnected state to the sidelink connected state upon the establishing the first unicast link with the second UE.

In Example 14, the method of any of examples 1-13 further includes that the first UE transitions from the sidelink connected state to the sidelink disconnected state if all unicast links to other peer UEs are released.

In Example 15, the method of any of examples 1-14 further includes the first UE and the second UE exchange respective unique UE identifications in initial messages of the unicast link establishment procedure to establish a unicast link between the first UE and the second UE.

In Example 16, the method of any of examples 1-15 further includes the initial messages of the unicast link establishment procedure comprise a Direct Communication Request or a Direct Communication Accept.

In Example 17, the method of any of examples 1-16 further includes the unique UE identification of the second UE is received in at least one of the response messages from the second UE to the first UE in an authentication and security association establishment procedure performed as part of the unicast link establishment procedure.

In Example 18, the method of any of examples 1-17 further includes the first UE transmits an indication to the base station it is connected to if the first UE transitions to sidelink disconnected state or sidelink connected state and is RRC connected.

In Example 19, the method of any of examples 1-18 further includes both the second UE and the first UE transmit an indication to the respective base station they are connected to if both the second UE and the first UE transition to sidelink disconnected state or sidelink connected state and both the second UE and the first UE are RRC connected.

Example 20 is a system or apparatus including means for implementing a method or realizing an apparatus as in any of examples 1-19.

Example 21 is a system including one or more processors and memory in electronic communication with the one or more processors to cause the system or apparatus to implement a method as in any of examples 1-19.

Example 22 is a non-transitory computer readable medium storing instructions executable by one or more processors to cause the one or more processors to implement a method as in any of examples 1-19.

Example 23 is a method of wireless communication at a UE that includes establishing one or more unicast links with at least one peer UE; changing a connection state of the UE from a sidelink disconnected state to a sidelink connected state based on an establishment of a first unicast link with the at least one peer UE; and changing the connection state of the UE from the sidelink connected state to the sidelink disconnected state when all of the one or more unicast links with the at least one peer UE are released.

In Example 24, the method of Example 23 further includes performing while in the sidelink connected state, at least one of: monitoring a PSCCH based on a configured sidelink C-DRX or performing connected mode sidelink RRM measurements for each of the one or more unicast links.

In Example 25, the method of Example 23 or Example 24 further includes that the C-DRX configuration is received from a base station or is negotiated between the UE and other peer UEs with which the UE has established a unicast link.

In Example 26, the method of any of Examples 23-25 further includes that the UE determines a wake-up cycle based on each C-DRX configuration associated with the one or more established unicast links.

In Example 27, the method of any of Examples 23-26 further includes that in the sidelink connected state, the UE further performs an additional wake-up outside of a configured C-DRX cycle to monitor for periodic discovery messages transmitted by other UEs.

In Example 28, the method of any of Examples 23-27 further includes that the C-DRX configuration is based on at least one of an application quality of service profile, a service type, or a power profile of the UE or the at least one peer UE.

In Example 29, the method of any of Examples 23-28 further includes monitoring physical layer channels for discovery messages transmitted by other peer UEs according to a configured periodicity while in the sidelink disconnected state.

Example 30 is a system or apparatus including means for implementing a method or realizing an apparatus as in any of examples 23-29.

Example 31 is a system including one or more processors and memory in electronic communication with the one or more processors to cause the system or apparatus to implement a method as in any of examples 23-29.

Example 32 is a non-transitory computer readable medium storing instructions executable by one or more processors to cause the one or more processors to implement a method as in any of examples 23-29.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first user equipment (UE), comprising:
    establishing one or more unicast links with a second UE;
    changing a connection state with the second UE from a sidelink disconnected state to a sidelink connected state based on an establishment of a first unicast link of the one or more unicast links;
    changing the connection state with the second UE from the sidelink connected state to the sidelink disconnected state when each of the one or more unicast links with the second UE is released or when a configured timer expires; and
    sending, to a serving base station, over a radio resource control (RRC) connection with the serving base station, an indication of the change in the connection state with the second UE from the sidelink connected state to the sidelink disconnected state.

2. The method of claim 1, further comprising monitoring, while in the sidelink connected state, a physical sidelink control channel (PSCCH) based on a configured sidelink connected mode discontinuous reception (C-DRX).

3. The method of claim 2, wherein the C-DRX configuration is negotiated between the first UE and the second UE.

4. The method of claim 2, wherein the second UE comprises a peer UE, the method further comprising:
    monitoring the PSCCH for data on unicast links established with other peer UEs and according to the C-DRX configuration while in the sidelink connected state.

5. The method of claim 1, further comprising determining a wake-up cycle based on a C-DRX configuration associated with each of the one or more unicast links established with the second UE.

6. The method of claim 1, further comprising transitioning to the sidelink disconnected state when data transmission is completed on each of the one or more established unicast links with the second UE.

7. The method of claim 6, further comprising sending, to the second UE, upon the completion of data transmission on each of the one or more unicast links with the second UE, a release message indicating the transition to the sidelink disconnected state, wherein the release message comprises a disconnect request or a disconnect response.

8. The method of claim 1, further comprising transitioning to the sidelink disconnected state when, after completion of data transmission on the one or more unicast links with the second UE, the configured timer is started at the first UE and there is no further data transmission with the second UE before the configured timer expires.

9. The method of claim 1, further comprising monitoring physical layer channels for discovery messages transmitted by other UEs according to a configured periodicity while in the sidelink disconnected state.

10. The method of claim 1, wherein the changing the connection state comprises transitioning from the sidelink disconnected state to the sidelink connected state upon establishing the first unicast link with the second UE, further comprising receiving, from the second UE, a unique UE identification as part of an exchange of respective unique UE identifications between the first UE and the second UE in initial messages of a unicast link establishment procedure to establish a unicast link between the first UE and the second UE.

11. The method of claim 10, further comprising receiving, from the second UE, at least one response message comprising a unique UE identification of the second UE in an authentication and security association establishment procedure performed as part of the unicast link establishment procedure.

12. The method of claim 10, wherein the initial messages of the unicast link establishment procedure comprise a direct communication request or a direct communication accept.

13. The method of claim 1, sending, to the serving base station, over the RRC connection with the serving base station, an indication of the change in the connection state with the second UE from the sidelink disconnected state to the sidelink connected state.

14. An apparatus for wireless communication at a user equipment (UE), comprising:
means for establishing one or more unicast links with a second UE;
means for changing a connection state with the second UE from a sidelink disconnected state to a sidelink connected state based on an establishment of a first unicast link of the one or more unicast links;
means for changing the connection state with the second UE from the sidelink connected state to the sidelink disconnected state when each unicast link of the one or more unicast links with the second UE is released or when a configured timer expires; and
means for sending, to a serving base station, over a radio resource control (RRC) connection with the serving base station, an indication of the change in the connection state with the second UE from the sidelink connected state to the sidelink disconnected state.

15. The apparatus of claim 14, further comprising means for monitoring a physical sidelink control channel (PSCCH) while in the sidelink connected state based on a configured sidelink connected mode discontinuous reception (C-DRX).

16. The apparatus of claim 15, wherein the C-DRX configuration is negotiated between the first UE and the second UE.

17. The apparatus of claim 15, wherein the second UE comprises a peer UE, and further comprising means for monitoring the PSCCH for data on unicast links established with other peer UEs and according to the C-DRX configuration while in the sidelink connected state.

18. The apparatus of claim 14, further comprising means for determining a wake-up cycle based on a C-DRX configuration associated with each of the one or more unicast links established with the second UE.

19. The apparatus of claim 14, further comprising, while in the sidelink connected state:
means for determining the state of each of the one or more unicast links; and
means for performing connected mode sidelink radio resource management (RRM) measurements for each of the one or more unicast links.

20. The apparatus of claim 14, further comprising means for transitioning to the sidelink disconnected state when, after completion of data transmission on the one or more unicast links with the second UE, the configured timer is started at the first UE and there is no further data transmission with the second UE before the configured timer expires.

21. An apparatus for wireless communication at a first user equipment (UE), comprising:
a memory; and
at least one processor coupled to the memory and configured to:
establish one or more unicast links with a second UE;
change a connection state with the second UE from a sidelink disconnected state to a sidelink connected state based on an establishment of a first unicast link of the one or more unicast link;
change the connection state with the second UE from the sidelink connected state to the sidelink disconnected state when each unicast link of the one or more unicast links with the second UE is released or when a configured timer expires; and
send, to a serving base station, over a radio resource control (RRC) connection with the serving base station, an indication of the change in the connection state with the second UE from the sidelink connected state to the sidelink disconnected state.

22. The apparatus of claim 21, wherein the at least one processor is further configured to monitor a physical sidelink control channel (PSCCH) while in the sidelink connected state based on a configured sidelink connected mode discontinuous reception (C-DRX).

23. The apparatus of claim 22, wherein the C-DRX configuration is negotiated between the first UE and the second UE.

24. The apparatus of claim 22, wherein the second UE comprises a peer UE, and the at least one processor is further configured to monitor the PSCCH for data on unicast links established with other peer UEs and according to the C-DRX configuration while in the sidelink connected state.

25. The apparatus of claim 21, wherein the at least one processor is further configured to determine a wake-up cycle based on a C-DRX configuration associated with each of the one or more unicast links established with the second UE.

26. The apparatus of claim 21, wherein, while the first UE is in the sidelink connected state, the at least one processor is further configured to:
- determine the state of each of the one or more established unicast links; and
- perform connected mode sidelink radio resource management (RRM) measurements for each of the one or more unicast links.

27. The apparatus of claim 21, wherein the at least one processor is further configured to transition to the sidelink disconnected state when data transmission is completed on each of the one or more unicast links with the second UE.

28. The apparatus of claim 27, wherein the at least one processor is further configured to transition to the sidelink disconnected state when, after completion of data transmission on the one or more unicast links with the second UE, the configured timer is started at the first UE and there is no further data transmission with the second UE before the configured timer expires.

29. The apparatus of claim 27, wherein after completion of data transmission on each of the one or more unicast links with the second UE, the at least one processor is further configured to send a release message to the second UE to indicate the transition to the sidelink disconnected state, wherein the release message comprises a disconnect request or a disconnect response.

30. The apparatus of claim 21, wherein the at least one processor is further configured to monitor physical layer channels for discovery messages transmitted by other UEs according to a configured periodicity while in the sidelink disconnected state.

31. A non-transitory computer-readable medium storing computer executable code for wireless communication at a user equipment (UE), the code when executed by a processor causes the processor to:
- establish one or more uni cast links with a second UE;
- change a connection state with the second UE from a sidelink disconnected state to a sidelink connected state based on an establishment of a first unicast link of the one or more unicast link;
- change the connection state with the second UE from the sidelink connected state to the sidelink disconnected state when each unicast link of the one or more unicast links with the second UE is released or when a configured timer expires; and
- send, to a serving base station, over a radio resource control (RRC) connection with the serving base station, an indication of the change in the connection state with the second UE from the sidelink connected state to the sidelink disconnected state.

* * * * *